United States Patent
Fioravanzo et al.

(10) Patent No.: US 9,682,741 B2
(45) Date of Patent: Jun. 20, 2017

(54) APPARATUS AND METHOD FOR ADJUSTING THE PRE-LOAD OF A MOTORBIKE SUSPENSION SPRING

(71) Applicant: PIAGGIO & C. S.p.A., Potedera, Pisa (IT)

(72) Inventors: Fabio Fioravanzo, Pisa (IT); Antonio Ingala, Pisa (IT); Andrea Ricci Iamino, Pisa (IT)

(73) Assignee: PIAGGIO & C. S.P.A., Potedera, Pisa (IT)

( * ) Notice: Subject to any disclaimer, the term of this patent is extended or adjusted under 35 U.S.C. 154(b) by 57 days.

(21) Appl. No.: 14/764,952

(22) PCT Filed: Feb. 19, 2014

(86) PCT No.: PCT/IB2014/059085
§ 371 (c)(1),
(2) Date: Jul. 30, 2015

(87) PCT Pub. No.: WO2014/128617
PCT Pub. Date: Aug. 28, 2014

(65) Prior Publication Data
US 2015/0375823 A1    Dec. 31, 2015

(30) Foreign Application Priority Data
Feb. 22, 2013  (IT) ............................. PD2013A0040

(51) Int. Cl.
*B62K 25/00* (2006.01)
*B62K 25/04* (2006.01)
(Continued)

(52) U.S. Cl.
CPC .............. *B62K 25/04* (2013.01); *B60G 17/02* (2013.01); *B60G 17/08* (2013.01); *B62K 25/00* (2013.01);
(Continued)

(58) Field of Classification Search
None
See application file for complete search history.

(56) References Cited

U.S. PATENT DOCUMENTS

| 5,211,420 A | * | 5/1993 | Iwashita | B60G 15/063 |
|---|---|---|---|---|
| | | | | 180/219 |
| 2013/0144489 A1 | * | 6/2013 | Galasso | B60G 17/018 |
| | | | | 701/37 |

FOREIGN PATENT DOCUMENTS

| EP | 2 202 140 A1 | 6/2010 |
|---|---|---|
| JP | H04 321481 A | 11/1992 |

(Continued)

OTHER PUBLICATIONS

International Search Report of PCT/IB2014/059085 dated Mar. 19, 2014.

*Primary Examiner* — Angela Ortiz
*Assistant Examiner* — Garrett Evans
(74) *Attorney, Agent, or Firm* — Arent Fox LLP (57) ABSTRACT

A motorcycle suspension that includes a fork hinged to a portion of a frame of a motorcycle, a damper unit positioned between the frame and the fork, that damper unit having at least one spring and at least one damper so as to permit a relative rotation of the fork in relation to the frame around at least one hinge pin. The suspension including a load sensor to measure the load weighing on the damper unit, and a control unit operatively connected to the load sensor. The control unit is operatively connected to a regulation means of the damper unit so as to vary the setting of the regulation means depending on the load signal received from the load sensor, so as to adapt a pre-loading of the spring and the damping of the damper to the load effectively weighing on the damper unit.

18 Claims, 7 Drawing Sheets

(51) Int. Cl.
*B60G 17/02* (2006.01)
*B60G 17/08* (2006.01)
*B62K 25/28* (2006.01)

(52) U.S. Cl.
CPC .......... *B62K 25/28* (2013.01); *B60G 2300/12* (2013.01); *B62K 2025/044* (2013.01)

(56) References Cited

FOREIGN PATENT DOCUMENTS

| | | |
|---|---|---|
| WO | WO 00/40429 A2 | 7/2000 |
| WO | WO 2008/038321 A1 | 4/2008 |

* cited by examiner

APPARATUS AND METHOD FOR ADJUSTING THE PRE-LOAD OF A MOTORBIKE SUSPENSION SPRING

CROSS-REFERENCE TO RELATED APPLICATIONS

This application is a National Stage entry of International Application No. PCT/IB2014/059085, filed Feb. 19, 2014, which claims priority to Italian Patent Application No. PD2013A000040, filed Feb. 22, 2013. The disclosures of the priority applications are incorporated in their entirety herein by reference.

FIELD OF APPLICATION

The present invention relates to a motorcycle suspension with automatic regulation of the pre-loading and of damping as well as the relative automatic regulation method of a motorcycle suspension".

STATE OF THE ART

As is known, a motorcycle suspension consists of a hydraulic part, which acts as a damper of the oscillations, and a mechanical part of elastic coupling of the components operatively connected by said suspension, that is a portion of the frame, and a wheel, generally the rear wheel.

In the motorcycle sector, the regulation both of the pre-loading of the spring and of the damper component of the rear suspension is very important, especially for touring vehicles which may be ridden by the rider alone or at full load. The difference between the minimum load corresponding to the rider only, and the full load, corresponding for example to the driver and to the addition of passenger and one or more saddlebags is significant: the static load weighing on the rear suspension, in the passage from minimum to maximum load may in fact double.

It is evident therefore, that in order to optimise both the dynamic performance and comfort of the motorised vehicle, that the possibility of regulating the functioning parameters of the rear suspension of the motorised vehicle must be provided for, both in terms of damping and of pre-loading. Conversely, an intermediate calibration would have to be opted for which would not give optimal performance and would be of reduced comfort in any conditions deviating from the technical project parameters.

PRESENTATION OF THE INVENTION

To resolve the aforesaid problems, as of today some solutions have been used in the prior art.

For example, in some prior solutions, relative to mechanical suspensions, pre-loading regulation is performed using a manually operated knob or ring-nuts and a dedicated adjustment spanner. In recent years some motorcycle manufacturers have also introduced electrically operated systems which permit pre-loading regulation at various levels (usually 3-4) using the menu on the instrument panel. The instrument panel sends the information to a control panel which commands an actuator consisting of an electric motor which compresses oil in a chamber which operates the mechanical device, which in turn compresses the spring. This way the pre-loading of the spring of the suspension can be varied at different set levels. Alternatively the motor may be fitted directly onto the pre-loading device and coupled thereto by means of gears and worms.

Such prior solutions have several drawbacks however.

In fact, pre-loading regulation is not automatic but must instead be reset by the user at predefined levels which are not always optimal settings for the motorcycle. In addition, upon varying the load conditions of the motorcycle, the user must remember each time to vary the suspension settings manually, that is using the aforementioned ring-nut or knob, or semi-automatically, modifying the settings using the commands placed for example on the instrument panel.

In any case, the prior solutions do not permit continuous and automatic regulation of pre-loading and damping of the rear suspension, as the load weighing thereon varies.

The need is therefore felt to resolve the drawbacks and limitations mentioned above with reference to the prior art.

Such requirement is satisfied by a rear suspension according to claim 1 and by a regulation method of a rear suspension according to claim 10

DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

Figure 1:
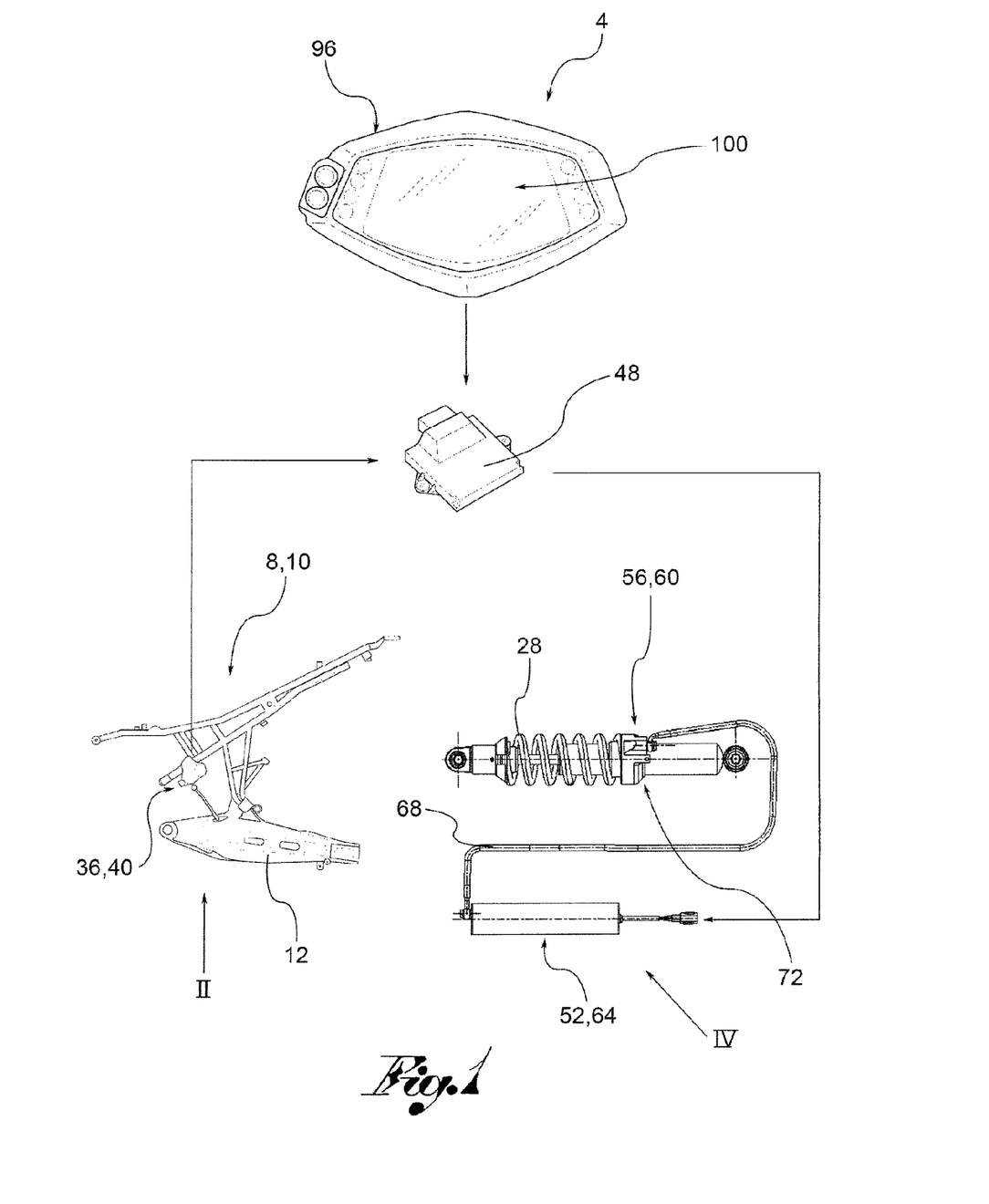
FIG. 1 is an overall, schematic view, of a regulation and control system of a motorcycle suspension according to the present invention.
Figure 2A:
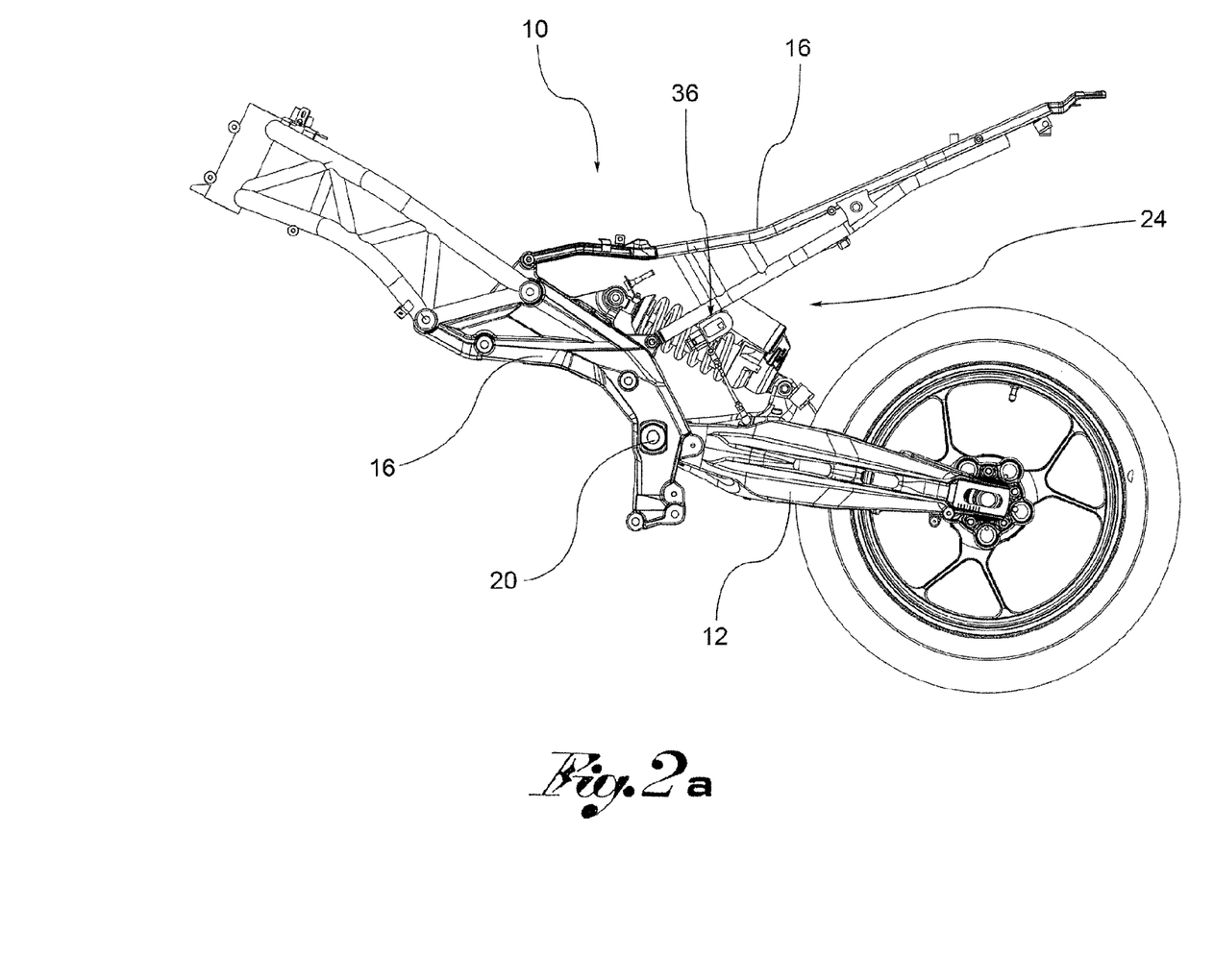
FIGS. 2a-2b show views from different angles of the detail II in FIG. 1.
Figure 2B:
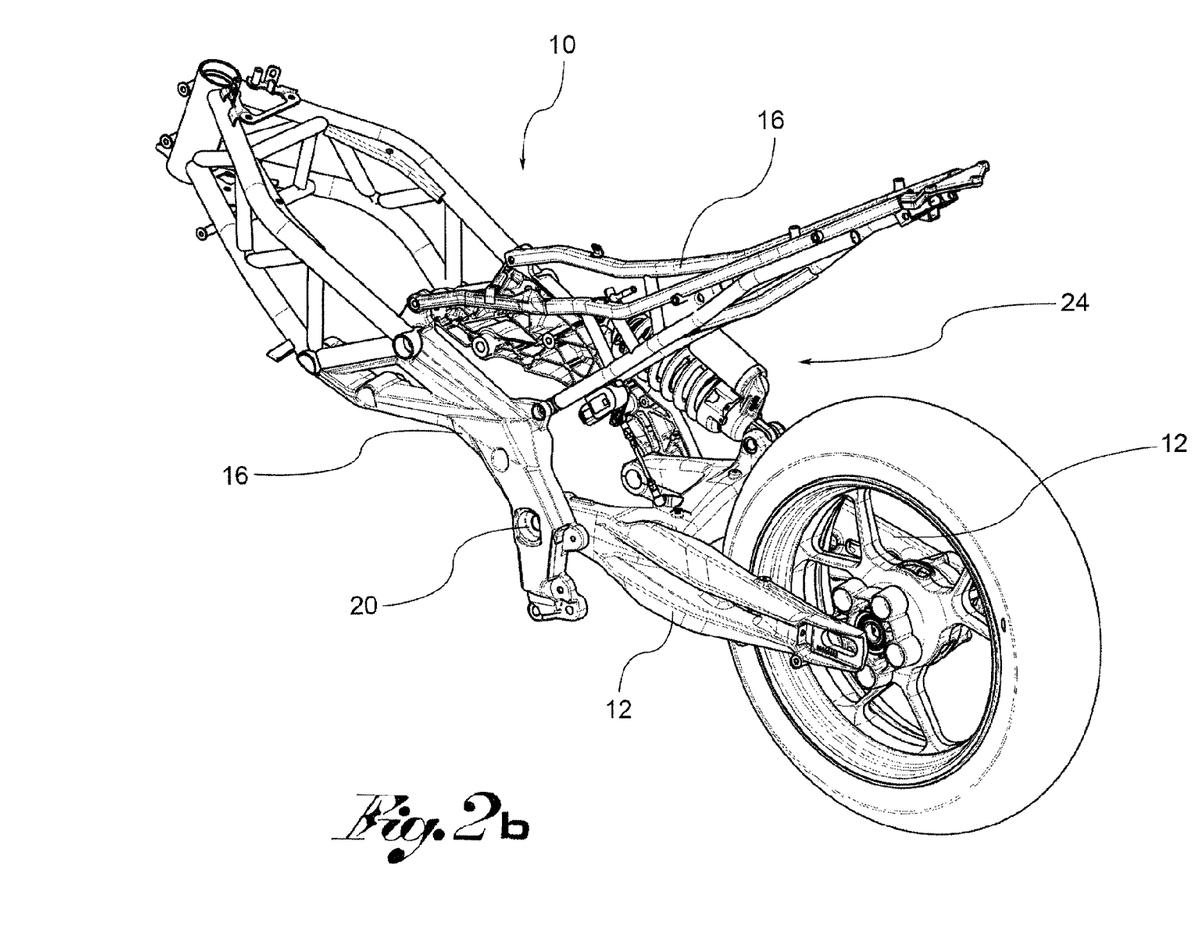

With reference to the aforementioned figures, reference numeral 4 globally denotes an overall schematic view of a motorcycle suspension 8 according to the present invention, applied to a motorcycle 10.

For the purposes of the present invention it must be specified that the term motorcycle must considered in a broad sense, comprising any motorcycle having at least two wheels, that is a front wheel and a back wheel. Such definition thus encompasses motor cycles having three wheels, of which for example two paired and steering wheels on the front axle and one drive wheel, on the rear axle, but also motorcycles which comprise a single steering wheel on the front axle and two drive wheels on the rear axle.

Preferably, the term motorcycle suspension 8 is understood to mean a suspension, for example, rear, that is placed between the axle or fork 12, for example rear, having one or more wheels, and the frame 16 operatively connected to said suspension.

It is to be specified that, the present invention may also be applied to a front fork; in such case the motorcycle suspension 8 is placed between the front axle or axles, having one or more wheels, and the frame operatively connected to said suspension.

In the continuation of the description, reference will be made to a rear fork, that is to the rear axle of a motorised vehicle but the invention is to be understood as indiscriminately applicable to a front fork or front axle.

Both the fork 12 and the frame may be of any shape or dimension and may for example be of the trellis type, box type, die-cast and so forth.

The frame 16 may be in one piece or in several parts: generally the portion of frame 16 interfacing with the fork 12 supports the saddle for the rider and/or passenger. The fork 12 is hinged to said portion of frame 16 of the motorcycle 10 in relation to at least one hinge pin 20. It is to be specified that, the connection between the fork 12 and the frame 16 may be direct, by means of direct hinging, or may also be made by the interposition of linkages and/or intermediate subframes.

The suspension 8 further comprises a damper unit 24, positioned between the frame 16 and the fork 12, comprising at least one spring 28 and at least one damper 32 so as to permit a relative rotation of the fork 12 in relation to the frame 16 around said at least one hinge pin 20.

According to one embodiment, the spring 28 and the damper 32 are positioned coaxially to each other and preferably parallel to each other.

The spring 28 is generally a coil spring; the pitch of the spring 28 may be fixed or variable. The mechanical spring for example made of metal or polymer material, may also be replaced by an air spring.

The damper 32 is typically of the hydraulic type and provides for at least one inner through valve of hydraulic fluid so as to damp the oscillations induced by the spring 28.

The suspension 8 according to the present invention comprises a load sensor 36 to measure the load weighing on the damper unit 24 depending on the shift of the fork 12 in relation to the frame 16.

Preferably, said load sensor 36 is a rotary sensor which measures the angle of relative rotation between the fork 12 and the portion of frame 16 to which the rotary sensor is attached, wherein the rotation is correlated to the load weighing on the damper unit.

In fact, depending on the load weighing on the damper unit 24, the spring 28 is compressed and/or extends permitting the relative rotation between the frame 16 and the fork 12. By knowing the rigidity of the spring, which is a known design parameter, and its compression/extension compared to a rest position, it is possible to calculate the effective load weighing on it.

Preferably, the load sensor 36 comprises a sensor body 40 and a jointed arm 44, hinged in relation to the sensor body 40, wherein the sensor body 40 and the jointed arm 44 are constrained to the frame 16 and to the fork 12 or vice versa, so as to be able to rotate in relation to each other following the relative movements between the frame 16 and the fork 12.

Figure 3A:
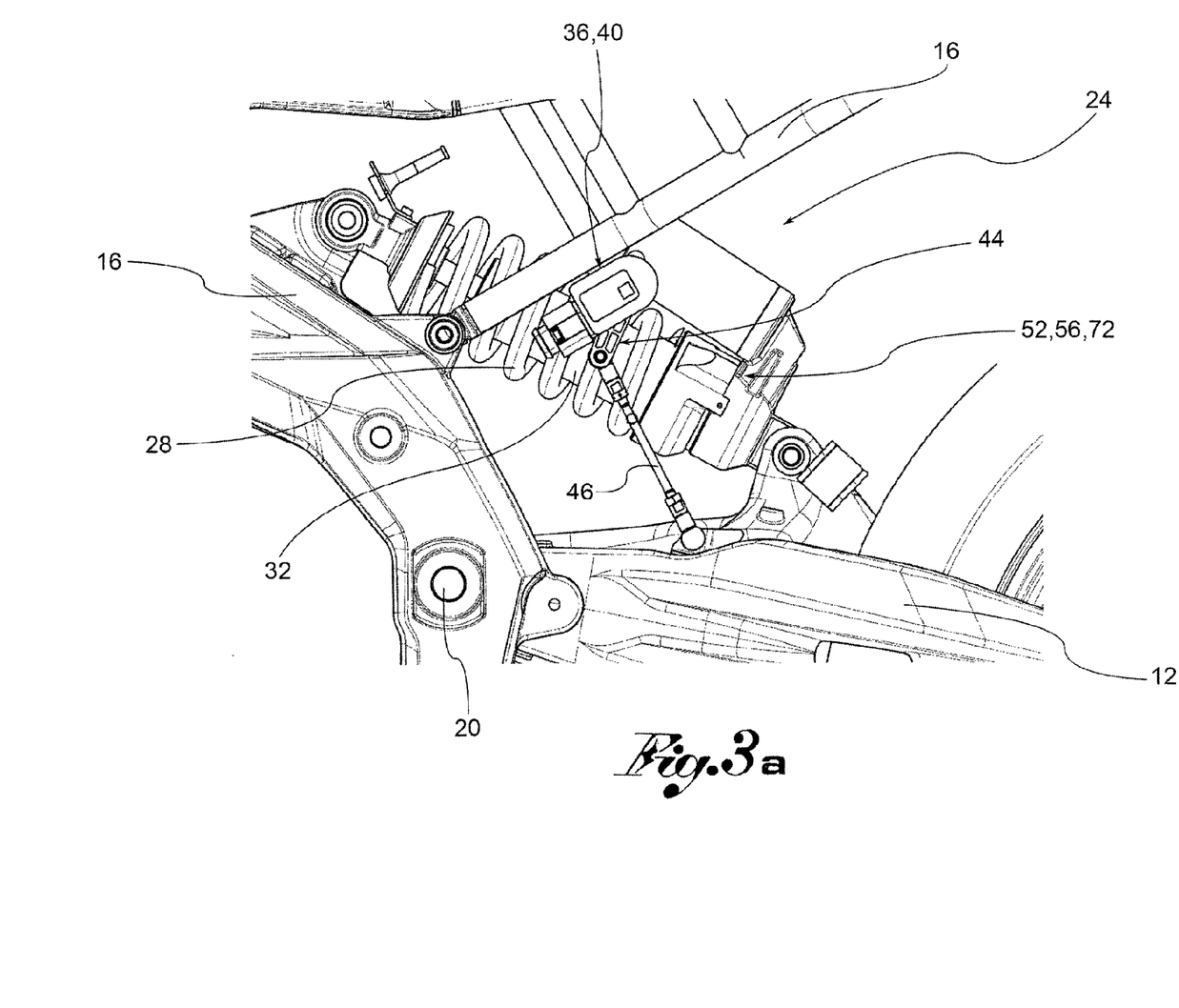
FIGS. 3a and 3b show enlarged views of the details III in FIGS. 2a and 2b respectively.
Figure 3B:
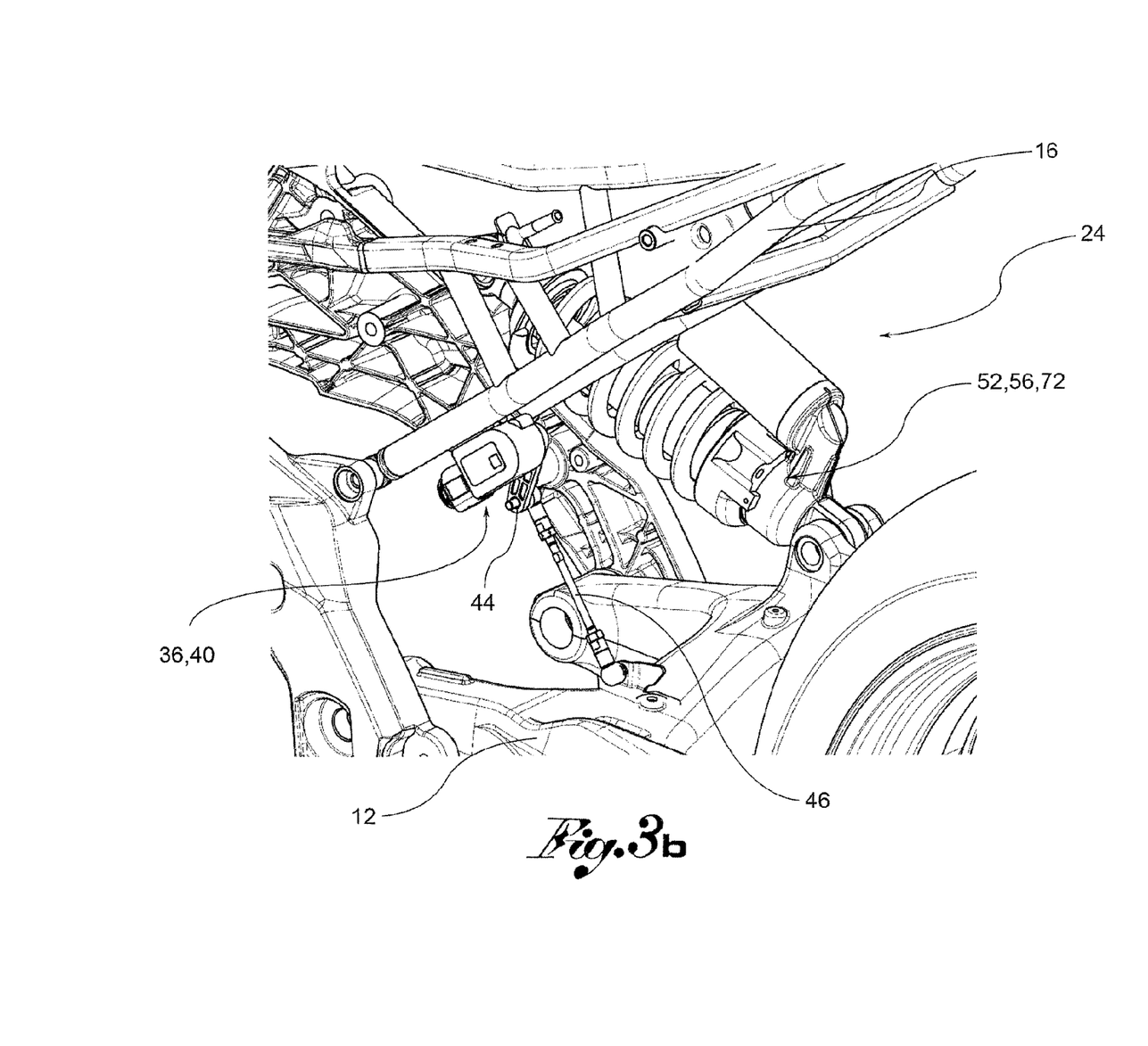

The jointed arm 44 may be kinematically connected to the fork 12 or to the frame 16 either directly or via the interposition for example of a lever 46, such as for example a rod.

The suspension 8 also comprises a control unit 48 operatively connected to said load sensor 36, and regulation means 52 of the damper unit 24 comprising, in particular, both regulation means of the pre-loading 56 of the spring 28 and regulation means of the damping 60 of the damper unit 32.

In particular, the pre-loading regulation means 56 are suitable for modifying the pre-load applied to the spring 28 in conditions of rest; consequently the pre-loading regulation means 56 are suitable to modify the rest length of the spring 28 by pre-loading it; this way the spring 28 is further compressed compared to the pre-load condition, only when a load superior to its pre-load is applied. In yet other words, the spring 28 behaves like a rigid body for all the loads applied thereto below its pre-load: it is clear therefore that changing the pre-load acting on the spring 28 makes it possible to modify the ability to filter or not the roughness of the road depending on the load acting on the damper unit.

Figure 4:
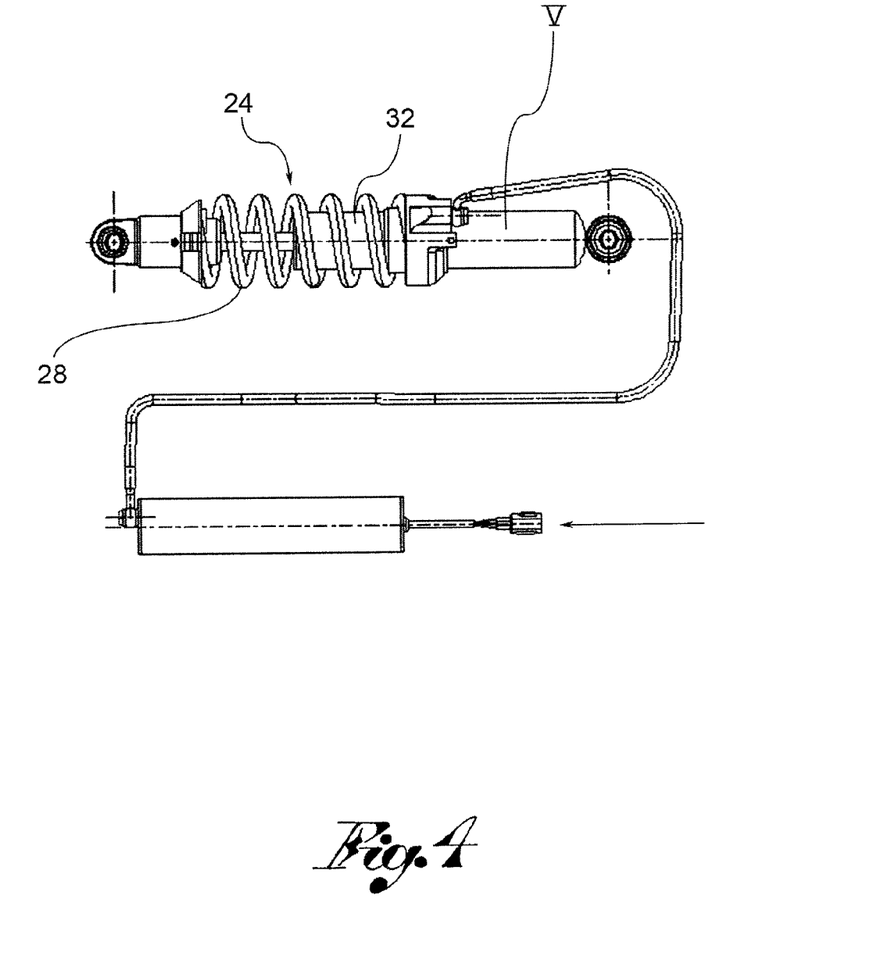
FIG. 4 shows an enlarged view of the detail IV in FIG. 1.

According to one embodiment, the pre-loading regulation means 56 of the spring 28 comprise an actuator comprising a motor which compresses a pressurised fluid, a connection tube 68 for delivery of said pressurised fluid and a compression device 72 of the spring 28 of the damper unit 24, fluidically connected to the connection tube 68 so as to be actuated by said pressurised fluid.

It is to be specified that, the pressurised fluid may comprise both a gas, for example air, and a liquid, for example oil.

According to a further embodiment, the pre-loading regulation means 56 of the spring 28 comprise an actuator comprising an electric motor which, by means of a direct connection and/or kinematic transmission belt, actuates a compression device 72 of the spring 28.

The damper regulation means 60 modify the capacity of the damper 32 to damp the oscillations induced by the spring 28.

Figure 5:
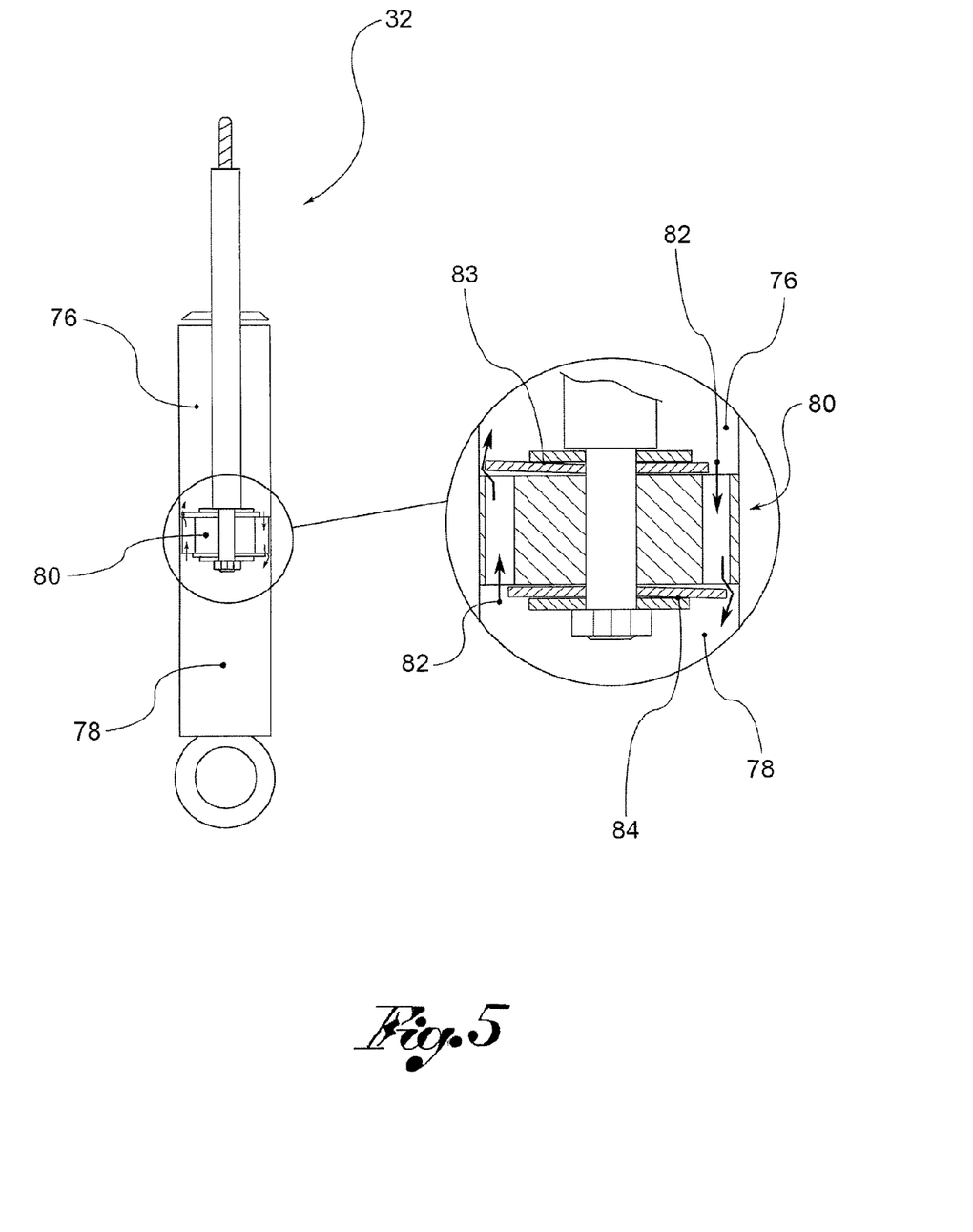
FIG. 5 shows an enlarged view, in cross-section, of the detail V in FIG. 4.

The damper 32 is usually a hydraulic-type damper comprising at least two containment chambers 76, 78 of a liquid separated by a piston 80 or obturator which regulates a through passage 82 of the liquid between said chambers 76, 78. The variation of such through passage 82 significantly modifies the capacity of the damper 32 to damp the oscillations induced by the spring 28.

Such variation may be calibrated differently for behaviour in compression and behaviour in extension; for example different compression 83 and extension 84 valves may be supplied so as to have different dampings depending on the effective extension or compression of the suspension.

According to a possible embodiment, the damper regulation means 60 comprise an obturator able to vary the through passage 82 of liquid between the chambers 76, 78 as desired. According to one embodiment, the damper 32 comprises an electro-actuated piston 80 able to increase or reduce the through passages of the liquid in a continuous and dynamic manner; such regulation takes place for example by modifying the quantity of current dispensed, by means of a control unit 48 operatively connected to said electro-actuated piston 80.

Advantageously, the control unit 48 is operatively connected to the regulation means 52 of the damper unit 24 so as to vary the setting of the regulation means 52 depending on the load signal received from the load sensor 36, for example rotary, so as to adapt the pre-loading of the spring 28 and the damping of the damper 32 to the load effectively weighing on the damper unit 24.

Preferably, target pre-loading values of the spring 28 and damping values of the damper 32 are stored in the control unit 48 depending on the load effectively weighing on the damper unit 24.

Preferably, the regulations performed by the regulation means 52 are performed contemporarily, that is to say the load weighing on the damper unit 24 being known or estimated, both the pre-loading of the spring 28 and the damping of the damper 32 are contemporarily regulated. In fact, the damping and pre-loading parameters are not independent of each other: for example an excessive damping in relation to the pre-load prevents the spring from extending or compressing itself rapidly while a reduced damping of the spring in relation to the pre-load in practice prevents effective damping of the oscillations of the spring.

According to one embodiment, the regulation means, operated by the control unit 48, contemporarily control the regulation means of the pre-loading 56 and the regulation means of the damping 60.

The regulation means 52 are preferably operable by a user in a riding position. For example, the motorcycle 10 has an instrument panel 96 provided with commands for operating the regulation means 52 of the damper group 24 and/or a display 100 for the display of the functioning status of said regulation means 52.

The functioning and thus the regulation of a rear suspension for motor cycles according to the present invention will now be described.

First of all, a motorcycle suspension group according to the present invention must be provided, namely a suspension having:
- a load sensor to determine the load weighing on the damper unit depending on the shift of the fork in relation to the frame, and a control unit operatively connected to said load sensor,
- regulation means of the damper unit comprising regulation means of the pre-loading of the spring and regulation means of the damping of the damper, in which the pre-loading regulation means are suitable for modifying the pre-load applied to the spring in rest conditions and the damper regulation means modify the damping capacity of the oscillations induced by the spring.

The control unit is then operatively connected to the regulation means of the damper unit, and the setting of the regulation means is varied depending on the load signal received from the rotary sensor, so as to adapt both the pre-loading of the spring and the damping of the damper to the load effectively weighing on the damper unit.

Such regulation step provides that the parameters of the regulation (that is of the pre-loading and the damping) are set on the basis of predefined values stored by the control unit.

Preferably, as seen, the regulations performed by the regulation means are performed contemporarily, that is to say the load weighing on the damper unit being known or estimated, the control means contemporarily regulate both the pre-loading of the spring and the damping of the damper.

Preferably, the estimate of the load weighing on the damper unit is performed by using as the load sensor, a rotary sensor which measures the angle of relative rotation between the fork and the portion of frame to which said rotary sensor is attached, and wherein the weight weighing on the suspension is calculated on the basis of the relative rotation between the fork and the portion of frame. In fact, based on the rotation measured and the hinging geometry of the fork to the frame, it is possible to calculate the linear compression or extension of the damper unit and consequently the load weighing thereon.

In addition, it is important to distinguish between the functioning of the suspension when the vehicle is substantially at a standstill and the functioning of the suspension with the vehicle moving.

In fact the method of regulation of the motorcycle suspension according to the present invention comprises the step of:
- identifying a static vehicle condition, in which:—the vehicle is functioning and is at a standstill or is travelling at a speed less than or equal to a maximum threshold value,
- the compression of the spring of the damper unit is below a threshold value, and wherein the compression value of the damper is below a threshold value,
- validating the static vehicle condition by means of said control unit and then activating the regulation means of the pre-loading of the spring and the regulation means of the damping of the damper depending on the load weighing on the suspension, identified in a static condition of the motorcycle. In particular, the parameters of the regulation means are set on the basis of predefined values for the static vehicle condition, stored by the control unit.

Consequently, when the control panel identifies the static vehicle condition, the control unit performs a static regulation of the regulation means, that is modifies the pre-loading and damping parameters depending on the predefined values valid for the static vehicle condition.

According to one embodiment, the regulation process of the pre-loading of the spring and of the damping of the damper is cyclically and automatically reiterated so as to vary the regulations as the load weighing on the damper unit varies, wherein the regulation is repeated when the control unit detects that the motorcycle is in a static vehicle condition.

It is to be noted that each verification cycle lasts a predefined time: within such period or interval of time the control unit acquires the speed data of the vehicle, compression of the spring and speed of compression of the damper and performs the verifications for validation of the vehicle condition: in the case in which the static vehicle condition is validated for the entire time interval, the control unit, proceeds to activate the regulation means of the pre-loading of the spring and the regulation means of the damping of the damper depending on the load weighing on the suspension, identified in a static condition of the motorcycle.

The control unit is also able to identify a moving vehicle condition.

In particular, the regulation method comprises the steps of:
- identifying a moving vehicle condition, in which:
- the vehicle is functioning, moving and travelling at a speed greater than or equal to a minimum threshold value,
- the compression of the spring of the damper unit is equal to a mean value plus or minus a tolerance value, and wherein the compression of the damper unit is equal to a mean value plus or minus a threshold value,
- validating the moving vehicle condition by means of said control unit and then activating the regulation means of the pre-loading of the spring and the regulation means of the damping of the damper depending on the load weighing on the suspension,
- wherein the parameters of the regulation means are set on the basis of predefined values for the moving vehicle condition, stored by the control unit.

Consequently, when the control panel identifies the moving vehicle condition, the control unit performs a dynamic regulation of the regulation means, that is modifies the pre-loading and damping parameters depending on the predefined values valid for the moving vehicle condition.

Preferably, the regulation process of the pre-loading of the spring and of the damping of the damper is cyclically and automatically reiterated, so as to vary the regulations as the load weighing on the damper unit varies, wherein the regulation is repeated when the control unit detects that the motorcycle is in a moving vehicle condition.

It is to be noted that each verification cycle lasts a predefined time: within such period or interval of time the control unit acquires the speed data of the vehicle, compression of the spring and speed of compression of the damper and performs the verifications for validation of the vehicle condition: in the case in which the moving vehicle condition is validated for the entire time interval, the control unit proceeds to activate the regulation means of the pre-loading of the spring and the regulation means of the damping of the damper depending on the load weighing on the suspension, identified in a moving condition of the motorcycle.

In other words, whatever the condition of the vehicle, the control unit cyclically performs verification of the functioning condition of the vehicle and after having identified whether it is in a static or moving condition, verifies that the effective pre-loading and damping parameters are the same as those memorised by the unit for said static or dynamic condition; in the case of discrepancy between such values the control unit performs the regulations required.

As may be seen from the description, the suspension according to the invention makes it possible to overcome the drawbacks of the prior art presented.

In particular, the suspension makes it possible to activate an automatic regulation function in which the control unit, by reading the various vehicle parameters, automatically regulates the pre-loading and damping level based on the effective load weighing on the damper unit.

This way, the user does not have to perform any preventive regulation depending on the load applied to the motorcycle, having the certainty that any significant variation of the load; due for example to a passenger getting on or off or the addition/removal of a saddlebag, will be automatically recognised by the control unit which will perform all the necessary settings so as to ensure optimal performance in terms of road holding and comfort.

A person skilled in the art may make numerous modifications and variations to the suspensions and regulation methods described above so as to satisfy contingent and specific requirements, while remaining within the sphere of protection of the invention as defined by the following claims.

The invention claimed is:

1. A motorcycle suspension comprising:
   a portion of a frame of an associable motorcycle,
   a fork hinged to said portion of the frame of the motorcycle in relation to at least one hinge pin,
   a damper unit, positioned between said portion of the frame and the fork, comprising at least one spring and at least one damper so as to permit a relative rotation of the fork in relation to said portion of the frame around said at least one hinge pin, characterised in that
   the suspension comprises a load sensor to measure the load weighing on the damper unit depending on the shift of the fork in relation to said portion of the frame, and a control unit operatively connected to said load sensor,
   wherein the suspension comprises regulation means of the damper unit, comprising regulation means of the pre-loading of the spring and regulation means of the damping of the damper, in which the pre-loading regulation means are suitable for modifying the pre-loading applied to the spring in conditions of rest and the damper regulation means modify the damping capacity of the oscillations induced by the spring,
   wherein the control unit is operatively connected to the regulation means of the damper unit so as to vary the setting of the regulation means depending on the load signal received from the load sensor, so as to adapt the pre-loading of the spring and the damping of the damper to the load effectively weighing on the damper unit,
   wherein target pre-loading values of the spring and damping values of the damper are stored in the control unit depending on the load effectively weighing on the damper unit, and
   wherein said load sensor is a rotary sensor which measures the angle of relative rotation between the fork and the portion of the frame to which said rotary sensor is attached, said rotation being correlated to the load weighing on the damper unit.

2. The suspension according to claim 1, wherein said rotary sensor comprises a sensor body and a jointed arm, hinged in relation to the sensor body, the sensor body and the jointed arm being constrained to said portion of the frame and to the fork or vice versa, so as to be able to rotate with each other following the relative movements between said portion of the frame and the fork.

3. The suspension according to claim 1, wherein the pre-loading regulation means of the spring comprise an actuator comprising a small motor which compresses a pressurised fluid, a connection tube for delivery of said pressurised fluid and a compression device of the spring of the damper unit, fluidically connected to the connection tube so as to be actuated by said pressurised fluid.

4. The suspension according to claim 1, wherein the pre-loading regulation means of the spring comprise an actuator comprising a small electric motor which, by means of a direct connection and/or kinematic transmission belt, actuates a compression device of the spring.

5. The suspension according to claim 3, wherein the damper regulation means comprise a damper comprising at least two containment chambers of a liquid separated by a piston which regulates a transit opening of the liquid between said chambers, and wherein said piston is electro-actuated so as to increase or reduce the passage opening of the liquid in a continuous and dynamic manner.

6. The suspension according to claim 1, in which the spring and the damper are positioned coaxially to each other.

7. The suspension according to claim 1, wherein the regulations performed by the regulation means are performed contemporarily, that is to say the load weighing on the damper unit being known or estimated, the control means contemporarily regulate both the pre-loading of the spring and the damping of the damper.

8. A motorcycle comprising at least one suspension according to claim 1, the motorcycle having an instrument panel provided with commands for activating the regulation means of the damper group and/or a display for the display of the functioning status of said regulation means.

9. A regulation method of a motorcycle suspension according to claim 1, said suspension being applied to a motorcycle, the method comprising the steps of:
   providing a load sensor to determine the load weighing on the damper unit depending on the shift of the fork in relation to said portion of the frame, and a control unit operatively connected to said load sensor,
   providing regulation means of the damper unit, comprising regulation means of the pre-loading of the spring and regulation means of the damping of the damper, in which the pre-loading regulation means are suitable for modifying the pre-loading applied to the spring in conditions of rest and the damper regulation means modify the damping capacity of the oscillations induced by the spring, operatively connecting the control unit to the regulation means of the damper unit, varying the setting of the regulation means depending on the load signal received from the load sensor, so as to adapt both the pre-loading of the spring and the damping of the damper to the load effectively weighing on the damper unit, wherein the parameters of the regulation means are set on the basis of predefined values stored by the control unit.

10. The regulation method of a motorcycle suspension according to claim 9, wherein the weight weighing on the suspension is calculated on the basis of the relative rotation between the fork and the portion of the frame.

11. The regulation method of a motorcycle suspension according to claim 9, applied to a motorcycle, comprising the steps of:

identifying a static vehicle condition, in which:
the vehicle is functioning and is at a standstill or is travelling at a speed less than or equal to a maximum threshold value,
the compression of the spring of the damper unit is below a threshold value, and wherein the compression value of the damper is below a threshold value,
validating the static vehicle condition by means of said control unit and then activating the regulation means of the pre-loading of the spring and the regulation means of the damping of the damper depending on the load weighing on the suspension, identified in a static motorcycle condition,
wherein the parameters of the regulation means are set on the basis of predefined values for the static vehicle condition stored by the control unit.

12. The regulation method according to claim 9, wherein the regulation process of the pre-loading of the spring and of the damping' of the damper is cyclically and automatically reiterated so as to vary the regulations as the load weighing on the damper unit varies, in which the regulation is repeated when the control unit detects that the motorcycle is in a static vehicle condition.

13. The regulation method according to claim 9, wherein the regulation process of the pre-loading of the spring and of the damping of the damper provides that the acquisition of the speed data of the vehicle, compression of the spring and speed of compression of the damper takes place at intervals or periods of time having a predefined duration, during which the control unit acquires the data and performs tests for validation of a static vehicle condition, and in which, if the static vehicle condition is validated for the entire time interval, the control unit proceeds to activate the regulation means of the pre-loading of the spring and the regulation means of the damping of the damper depending on the load weighing on the suspension, identified in a static condition of the motorcycle.

14. The regulation method according to claim 9, comprising the steps of:

identifying a moving vehicle condition, in which:
the vehicle is functioning, moving and travelling at a speed greater than or equal to a minimum threshold value,
the compression of the spring of the damper unit is equal to a mean value plus or minus a tolerance value, and wherein the compression speed of the damper is equal to a mean value plus or minus a threshold value,
validating the moving vehicle condition by means of said control unit and then activating the regulation means of the pre-loading of the spring and the regulation means of the damping of the damper depending on the load weighing on the suspension,
wherein the parameters of the regulation means are set on the basis of predefined values for the moving vehicle condition, stored by the control unit.

15. The regulation method according to claim 14, wherein the regulation process of the pre-loading of the spring and of the damping of the damper is cyclically and automatically reiterated so as to vary the regulations as the load weighing on the damper unit varies, wherein the regulation is repeated when the control unit detects that the motorcycle is in a moving vehicle condition.

16. The regulation method according to claim 14, wherein the regulation process of the pre-loading of the spring and of the damping of the damper provides that the acquisition of the speed data of the vehicle, compression of the spring and speed of compression of the damper takes place at intervals or periods of time having a predefined duration, during which the control unit acquires the data and performs the tests for validation of the moving vehicle condition, and in which, if the moving vehicle condition is validated for the entire time interval, the control unit proceeds to activate the regulation means of the pre-loading of the spring and the regulation means of the damping of the damper depending on the load weighing on the suspension, identified in a moving condition of the motorcycle.

17. The regulation method according to claim 9, wherein the regulations performed by the regulation means are performed contemporarily, that is to say the load weighing on the damper unit being known or estimated, the control means contemporarily regulate both the pre-loading of the spring and the damping of the damper.

18. The regulation method according to claim 9, wherein the regulation means, operated by the control unit, contemporarily control the regulation means of the pre-loading and the regulation means of the damping, by means of separate actuators.

* * * * *